(12) United States Patent
Roytman et al.

(10) Patent No.: US 11,507,581 B2
(45) Date of Patent: Nov. 22, 2022

(54) QUERY RESPONSE DEVICE

(71) Applicant: Accenture Global Services Limited, Dublin (IE)

(72) Inventors: Anatoly Roytman, London (GB); Alexandre Naressi, Valbonne (FR)

(73) Assignee: Accenture Global Services Limited, Dublin (IE)

( * ) Notice: Subject to any disclaimer, the term of this patent is extended or adjusted under 35 U.S.C. 154(b) by 85 days.

(21) Appl. No.: 16/866,648

(22) Filed: May 5, 2020

(65) Prior Publication Data

US 2020/0265051 A1 Aug. 20, 2020

Related U.S. Application Data

(63) Continuation of application No. 15/282,408, filed on Sep. 30, 2016, now Pat. No. 10,671,614, which is a
(Continued)

(30) Foreign Application Priority Data

Jul. 3, 2013 (EP) ..................................... 13305948

(51) Int. Cl.
*H04M 3/51* (2006.01)
*G06N 20/00* (2019.01)
(Continued)

(52) U.S. Cl.
CPC .... *G06F 16/24564* (2019.01); *G06F 16/9535* (2019.01); *G06N 5/00* (2013.01);
(Continued)

(58) Field of Classification Search
CPC .... H04M 3/51; H04M 3/5233; G06F 16/9535
(Continued)

(56) References Cited

U.S. PATENT DOCUMENTS 6,070,142 A 5/2000 McDonough et al.
6,445,911 B1 9/2002 Chow et al.
(Continued)

FOREIGN PATENT DOCUMENTS

AU 2009255971 A1 12/2009
CN 101026595 A 8/2007
(Continued)

OTHER PUBLICATIONS

Kiselev. A et al., "Toward Incorporating Emotions With Rationality Into a Communicative Virtual Agent," Springer, 2011, vol. 26, pp. 275-289.
(Continued)

*Primary Examiner* — Ahmad F. Matar
*Assistant Examiner* — Jirapon Intavong
(74) *Attorney, Agent, or Firm* — Harrity & Harrity, LLP

(57) ABSTRACT

The invention concerns a query response device comprising: an input adapted to receive user queries; a memory (106) adapted to store one or more routing rules; one or more live agent engines (116) configured to support interactions with one or more live agents; one or more virtual assistant engines (120) configured to support interactions with one or more virtual assistants instantiated by an artificial intelligence module (103); and a routing module (104) coupled to said live agent engines and to said virtual assistant engines, the routing module comprising a processing device configured: to select, based on content of at least a first user message from a first user relating to a first user query and on said one or more routing rules, a first of said live agent engines or a first of said virtual assistant engines; and to route one or more further user messages relating to the first user query to the selected engine.

20 Claims, 3 Drawing Sheets

Related U.S. Application Data continuation of application No. 14/758,659, filed as application No. PCT/EP2014/064247 on Jul. 3, 2014, now Pat. No. 9,471,638.

(51) Int. Cl.

| | | |
|---|---|---|
| *G06F 16/2455* | (2019.01) | |
| *G06F 16/9535* | (2019.01) | |
| *G06N 5/00* | (2006.01) | |
| *G06N 5/02* | (2006.01) | |
| *H04M 3/523* | (2006.01) | |
| *H04M 7/00* | (2006.01) | |

(52) U.S. Cl.
CPC ............. *G06N 5/025* (2013.01); *G06N 20/00* (2019.01); *H04M 3/51* (2013.01); *H04M 3/5166* (2013.01); *H04M 3/5233* (2013.01); *H04M 7/00* (2013.01)

(58) Field of Classification Search
USPC .................................................. 379/266.05
See application file for complete search history.

(56) References Cited

U.S. PATENT DOCUMENTS

| | | | |
|---|---|---|---|
| 7,292,689 | B2 | 11/2007 | Odinak et al. |
| 8,160,985 | B2 | 4/2012 | Hino |
| 8,311,999 | B2 | 11/2012 | Todhunter et al. |
| 9,471,638 | B2 | 10/2016 | Roytman et al. |
| 10,552,743 | B2 | 2/2020 | Sneyders et al. |
| 2004/0162724 | A1* | 8/2004 | Hill .................... G10L 15/1822 704/231 |
| 2004/0162727 | A1* | 8/2004 | Hill et al. ............... G10L 15/00 704/231 |
| 2007/0043687 | A1 | 2/2007 | Bodart et al. |
| 2009/0245500 | A1 | 10/2009 | Wampler et al. |
| 2011/0141919 | A1 | 6/2011 | Singh et al. |
| 2011/0235797 | A1 | 9/2011 | Huet et al. |
| 2013/0094647 | A1 | 4/2013 | Mauro et al. |
| 2013/0346886 | A1 | 12/2013 | Cauchois et al. |
| 2014/0270108 | A1 | 9/2014 | Riahi et al. |
| 2017/0017694 | A1 | 1/2017 | Roytman et al. |
| 2018/0007202 | A1* | 1/2018 | Batlle ................. H04M 3/5166 |

FOREIGN PATENT DOCUMENTS

| | | | |
|---|---|---|---|
| CN | 101159888 A | 4/2008 | |
| CN | 101179620 A | 5/2008 | |
| CN | 101364995 A | 2/2009 | |
| CN | 102037432 A | 4/2011 | |
| CN | 102439594 A | 5/2012 | |
| DE | 112006004194 A5 | 10/2009 | |
| EP | 2582123 A1 | 4/2013 | |
| WO | 0209399 A2 | 1/2002 | |
| WO | WO-03069874 A2 * | 8/2003 | ............. G06Q 10/02 |
| WO | 2004044734 A2 | 5/2004 | |

OTHER PUBLICATIONS

Extended European Search Report for Application No. EP15183342, dated Jan. 21, 2016, 6 pages.

International Search Report and Written Opinion for International Application No. PCT/EP2014/064247, dated Sep. 5, 2014, 9 pages.

Davoli M. et al., "Customer Support Systems and Methods Providing Integrated Self Directed, Virtual Agent and Live Agent Interaction Between Customers and Enterprises Over Data Networks", WO 02/09399 A2, Jan. 31, 2002. (Previously supplied and on IDS). (Year: 2002).

\* cited by examiner

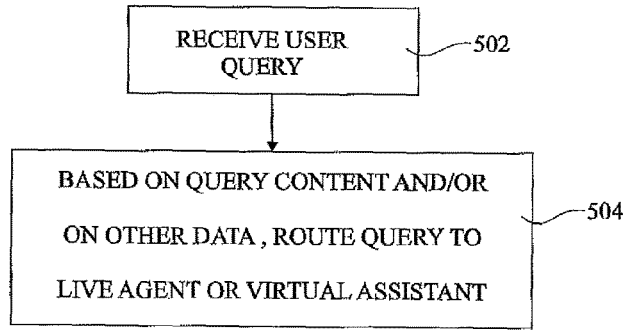
Fig 5
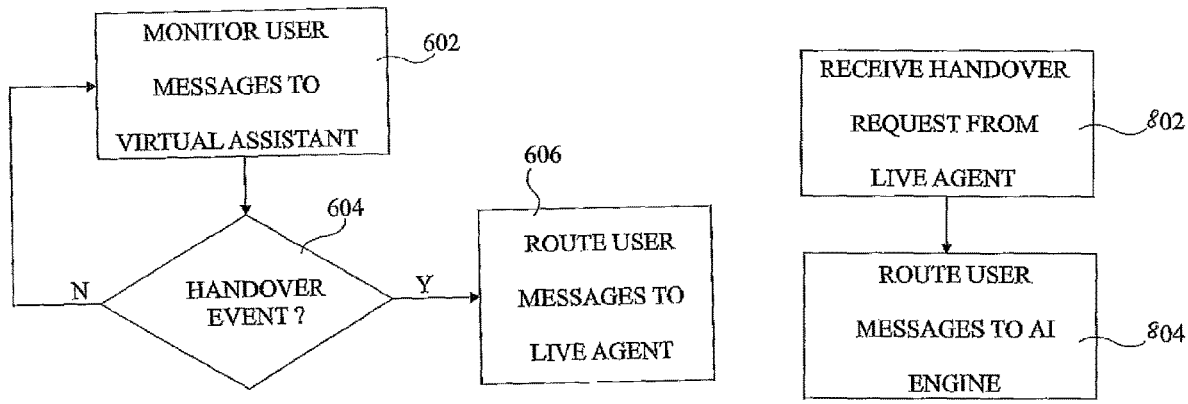
Fig 6
Fig 8
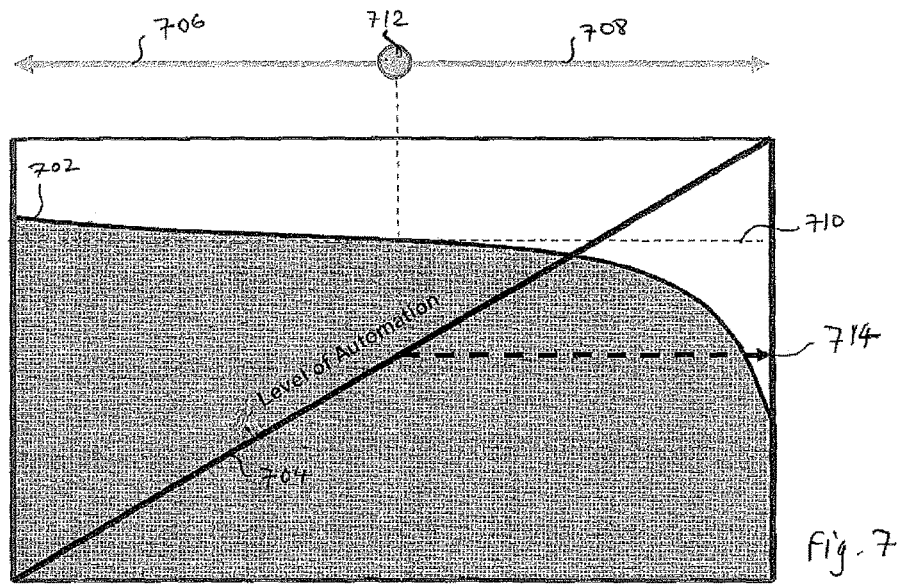
Fig 7

QUERY RESPONSE DEVICE

RELATED APPLICATIONS

This application is a continuation of U.S. patent application Ser. No. 15/282,408, filed Sep. 30, 2016, which is a continuation of U.S. patent application Ser. No. 14/758,659, filed Jun. 30, 2015 (now U.S. Pat. No. 9,471,638), which is a 371 application of PCT/EP2014/064247, filed Jul. 3, 2014, which claims priority to European Patent Application No. 13305948.5 filed on Jul. 3, 2013, the contents of which are incorporated herein by reference.

FIELD

The present disclosure relates to a query response system, and in particular to a device and method for responding to a user query using artificial intelligence.

BACKGROUND

Computer solutions, and in particular algorithms and processes known as artificial intelligence, are in use to an ever increasing extent by companies wishing to communicate with clients or customers. The main benefit is clear; the cost of implementing an artificial intelligence solution is a fraction of the cost of employing people to perform the same role.

However, there are technical difficulties in implementing such a system based on artificial intelligence. In particular, while for simple queries the system may be relatively efficient, in the case of more complex queries, or ones that have never before been presented to the system, current solutions are inadequate, as time and processing resources will be wasted in attempts to resolve the issues using existing artificial intelligence techniques, which will often end in failure. This leads to a heavy burden on the system in terms of the required memory and processing resources, in addition to a poor rate of user satisfaction. Furthermore, in view of this inefficiency, artificial intelligence solutions based on current technology must generally be designed to cope with a high number of concurrent user queries, leading to complex and costly infrastructures.

There is thus a need for a query response solution that overcomes the above drawbacks.

SUMMARY

It is an aim of embodiments of the present disclosure to at least partially address one or more needs in the prior art.

According to one aspect, there is provided a query response device comprising: an input adapted to receive user queries; a memory adapted to store one or more routing rules; one or more live agent engines configured to support interactions with one or more live agents; one or more virtual assistant engines configured to support interactions with one or more virtual assistants instantiated by an artificial intelligence module; and a routing module coupled to said live agent engines and to said virtual assistant engines, the routing module comprising a processing device configured: to select, based on content of at least a first user message from a first user relating to a first user query and on said one or more routing rules, a first of said live agent engines or a first of said virtual assistant engines; and to route one or more further user messages relating to the first user query to the selected engine, wherein, while the selected engine is the first of the live agent engines, the processing device is further configured to: intercept one or more messages between the first live agent engine and the first user; and to supply content of the one or more intercepted messages to a machine learning module in order to modify the capabilities of the artificial intelligence module.

According to one embodiment, the machine learning module is adapted to create, based on said content, at least one new rule to be followed by the artificial intelligence module.

According to one embodiment, the artificial intelligence module is adapted to apply the at least one new rule to a second user query received from a second user.

According to one embodiment, the selected engine is the first virtual assistant engine, and the processing device is further configured to invite one of the live agent engines to communicate with the first user following N further messages between the first user and the first virtual assistant engine, where N is a positive integer.

According to one embodiment, the processing device is further configured to determine the value of N based on a user satisfaction threshold level.

According to one embodiment, the machine learning module is configured to create at least one new rule to be followed by the artificial intelligence module based on one or more messages between the first user and the first live agent engine.

According to one embodiment, the processing device of the routing module is configured to: select, for said first user message, said first virtual assistant engine; and select, for a second user message relating to a second user query, said first live agent engine and to route said second user query to said first live agent engine.

According to one embodiment, the routing rules are based on the presence of keywords in at least the first user message, the presence of said keyword in said first user message indicating either: that the one or more further user messages related to the first user query should be routed to said first virtual assistant engine; or that the one or more further user messages related to the first user query should be routed to said first live agent engine.

According to one embodiment, each of the keywords is associated with a significance level determining the likelihood of a live agent engine being selected by the routing module, wherein the machine learning module is adapted to modify the significance level of at least one keyword based on the content of the one or more intercepted messages.

According to one embodiment, the processing device of the routing module is further configured to route one or more further messages from said first user to said selected engine and to determine, based on the content of said one or more further messages and on said routing rules, either: if said selected engine is said first live agent engine, that one or more subsequent messages from said first user should be routed to one of said virtual assistant engines; or if said selected engine is said first virtual assistant engine, that one or more subsequent messages from said first user should be routed to one of said live agent engines.

According to one embodiment, the artificial intelligence module is adapted to identify said first user based on an identifier, and to consult one or more information sources to obtain further information regarding said first user.

According to one embodiment, the processing device of the routing module is further configured to perform natural language processing on said user query in order to extract said content.

According to a further aspect, there is provided a method of processing, by a query response device, a user query, the method comprising: receiving a first user message relating to a first user query from a first user at an input of said query response device; selecting, by a processing device of a routing module, based on content of at least said first user message and on one or more routing rules stored in a memory, either: a first of one or more live agent engines configured to support interactions with one or more live agents; or a first of one or more virtual assistant engines configured to support interactions with one or more virtual assistants instantiated by an artificial intelligence module; and routing by said routing module said first user query to the selected engine, wherein, while the selected engine is the first live agent engine, the method further comprising: intercepting one or more messages between the first live agent engine and the first user; and supplying content of the one or more intercepted messages to a machine learning module in order to modify the capabilities of the artificial intelligence module.

According to one embodiment, the method further comprises creating, by a machine learning module based on the content, at least one new rule to be followed by the artificial intelligence module.

According to one embodiment, the method further comprises applying, by the artificial intelligence module, the at least one new rule to a second user query received from a second user.

According to one embodiment, the selection is based on a system setting defining the level of automation to be applied to user queries.

According to one embodiment, the selected engine is the first virtual assistant engine, the method further comprising inviting one of the live agent engines to communicate with the first user following N further messages between the first user and the first virtual assistant engine, where N is a positive integer.

According to one embodiment, the method further comprises determining the value of N based on the content of one or more of the further messages and based on a user satisfaction threshold.

According to one embodiment, the method further comprises creating, by the machine learning module, at least one new rule to be followed by the artificial intelligence module based on one or more messages between the first user and the first live agent engine.

According to one embodiment, the method further comprises: selecting, for said first user message, said first virtual assistant engine; and selecting, for a second user message relating to a second user query, said first live agent engine and routing said second user query to said first live agent engine.

According to one embodiment, the routing rules are based on the presence of keywords in at least the first user message, the presence of said keyword in said first user message indicating either: that the one or more further user messages related to the first user query should be routed to said first virtual assistant engine; or that the one or more further user messages related to the first user query should be routed to said first live agent engine.

According to one embodiment, each of the keywords is associated with a significance level determining the likelihood of a live agent engine being selected by the routing module, the method further comprising modifying, by the machine learning module, the significance level of at least one keyword based on the content of the one or more intercepted messages.

According to one embodiment, the method further comprises: routing one or more further messages from said first user to said selected engine; and determining, based on the content of said one or more further messages and on said routing rules, either: if said selected engine is said first live agent engine, that one or more subsequent messages from said first user should be routed to one of said virtual assistant engines; or if said selected engine is said first virtual assistant engine, that one or more subsequent messages from said first user should be routed to one of said live agent engines.

According to one embodiment, the method further comprises intercepting one or more messages between said first live agent engine and said first user, and supplying content of said messages to a machine learning module in order to modify the capabilities of said artificial intelligence module.

According to one embodiment, the artificial intelligence module is adapted to identify said first user based on an identifier, and to consult one or more information sources to obtain further information regarding said first user.

According to one embodiment, the method further comprises performing natural language processing on said user query in order to extract said content.

According to a further aspect, there is provided a computer-readable storage medium storing a computer program that, when executed by a processing device, causes the above method to be implemented.

The present disclosure describes a machine-human customer interaction system that combines artificial intelligence, live support, knowledge management, social crowd sourcing and self service. It has the following combined capabilities:
  it brings human- and machine-driven interactions together in a performance/outcome-driven way,
  it allows to flexibly set the balance between human- and machine-driven interaction modes, to supervise all interactions through a central system and to intervene if and when needed through live hand-over,
  it gradually enriches the underlying Artificial Intelligence by learning from all interactions (human and machine-driven ones),
  it connects to internal and externals sources of data to make the artificial intelligence context-aware and personalized and uses data-driven optimization techniques to increase interaction performance.

The Virtual Assistant solutions can generally handle customer interactions automatically across multiple channels, with varying levels of accuracy. They typically rely on an artificial engine which receives customer input, uses Natural Language Processing techniques to match it against a defined or statistically generated set of rules in order to trigger the most appropriate artificial intelligence flow and corresponding response sequence back to the customer. In certain cases, the response sequence contains an invitation to interact with a live agent, effectively deflecting the conversation to another channel.

The solution described herein for example targets all digital channels (e.g. Web chat, Voice, Self-service Search, Social Care, Community Platforms, In-store) and introduces the concept of a routing module, which performs the role of an Intelligent Interaction Broker, and for example fills two roles:
  Intercepts and dispatches interactions across Live Agent (human) and Virtual Assistant (machine) engines. This for example allows to strike automatically the right balance between human- and machine-driven interactions for a target level of accuracy and customer satisfaction, or to proactively intervene in a machine-driven interaction.

Monitor all interactions and learn from them by continuous enriching the Artificial Intelligence engine's ability to deal with new interactions, gradually replacing the need for Live agents on recurring tasks and allowing them to focus on higher value (e.g. up-sell), more sophisticated (e.g. complex problem resolution), or novel ones.

The machine learning function for example relies not only on the data provided by the Intelligence Interaction Broker, but also on other sources of structured and unstructured data, such as Social Community Platforms in order to enrich the Artificial Intelligence Engine and update existing Knowledge Bases used for self-care or by Live agents. The system goes therefore beyond dispatching customer interactions between humans and machines; it integrates with—and augments—the eco-system of customer-facing capabilities relying on knowledge bases (e.g. Self-care system, Q&A search portal, crowd-sourcing platforms).

Machine-Learning for Example Works in the Following Way:

Every interaction (e.g. input and output) is intercepted and filtered using Natural Language Processing techniques (e.g. topic classification and feature extraction) and event detection to feed a stack of interaction sequences that are good candidates for providing an input to enrich existing artificial intelligence rules. A good candidate can be for instance a problem resolution that has not yet been taken into account in the Artificial Intelligence, or a new way of dealing with a common issue (e.g. 80% of a sequence has been triggered, not yet with a successful outcome).

In addition to this automated filtering process, live agents and supervisors can for example proactively flag conversation sequences for consideration for Artificial Intelligence enrichment, e.g. within a Live agent Web chat application, the agent can click on a "flag for machine-learning" button in the context of a given conversation if he or she believes that this conversation is a good candidate. The system can assist users by automatically raising alerts or indicating candidacy levels to entice users to consider the current conversations for flagging.

Candidate sequences are then for example processed both automatically and manually to enrich existing artificial intelligence flows and rules.

On an ongoing basis, supervised and unsupervised data-driven optimization techniques are for example used to refine those flows and rules (e.g A/B testing and optimization).

The Artificial Intelligence connects in real-time via an Integration Backbone to external and internal systems to handle context-aware (e.g. ability to tap into a product catalog or Social Media interest graphs) and personalized (e.g. CBM integration) conversations with customers.

At any time, a supervisor or operator can for example monitor and analyze the performance of both human- and machine-driven conversations using a dashboard via any device. Performance is for example measured against KPIs (key performance indicators) such as number of sequences closed, customer satisfaction (when explicit feedback is asked, e.g. "was this answer useful?"), number of fallback sequences triggered (when the system cannot find an answer). The supervisor/operator can also for example view anomalies or interactions at risks and decide to hand machine-driven conversations over to live agents. Finally, in some examples, the supervisor can set threshold levels of performance that will be used by the Intelligent Interaction Broker to automatically drive the optimum balance of machine-driven vs human-driven interactions depending on the level of risk.

BRIEF DESCRIPTION OF THE DRAWINGS

The foregoing and other features and advantages will become apparent from the following detailed description of embodiments, given by way of illustration and not limitation with reference to the accompanying drawings, in which:

FIG. 5 is a flow diagram illustrating operations in a method of routing a user query according to an example embodiment of the present disclosure;

FIG. 6 is a flow diagram illustrating operations in a method for handing over a user to a live agent according to an example embodiment of the present disclosure;

FIG. 7 is a graph representing customer satisfaction as a function of system automation; and FIG. 8 is a flow diagram illustrating operations in a method for handing over a user to a virtual assistant engine according to an example embodiment of the present disclosure.

DETAILED DESCRIPTION

Figure 1:
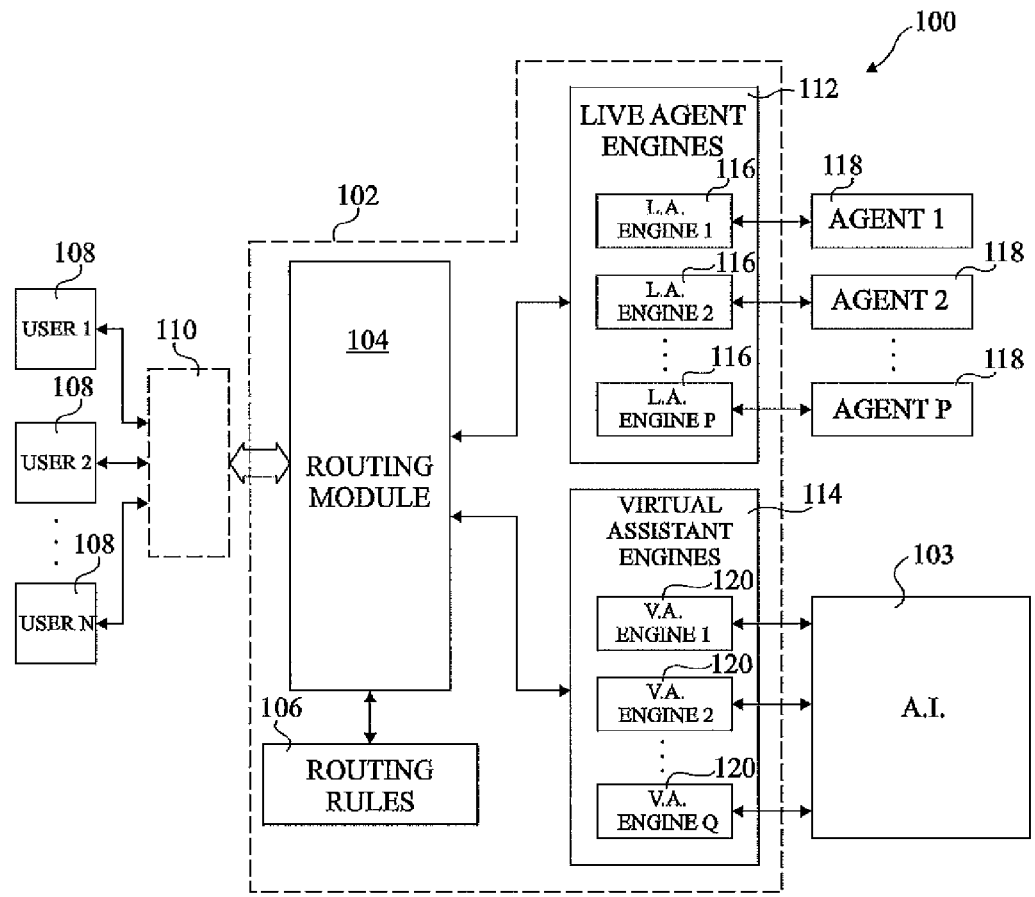
FIG. 1 schematically illustrates a query response system according to an example embodiment of the present disclosure.

FIG. 1 illustrates schematically a user response system 100. The system 100 comprises a user response device 102 that acts as the interface between users, live agents, and virtual assistants instantiated by an artificial intelligence module 103.

The user response device 102 includes a routing module 104, which applies routing rules 106. The routing module 104 receives user queries from N user devices 108, of which three are illustrated in the example of FIG. 1, associated with corresponding users USER 1, USER 2 and USER N. The user devices 108 for example correspond to those in active communication with the query response device 102 at any one time, and the number N of such devices, which may vary in real time, could be anywhere between one and several hundred or several thousand.

The user devices 108 are coupled to the user query device 102 via one or more intermediate networks 110, represented by a dashed block in FIG. 1, which may include a wired or wireless network or LAN (local area network), the internet and/or one or more mobile communication networks, etc.

User queries, and subsequent messages described hereafter between users and live agents/virtual assistants, could be in the form of typed text and/or voice, and are for example transmitted to the routing module 104 and on to their destination in the form of data packets. Each data packet for example comprises a header indicating an identifier of the user device 108 from which the query originates.

The routing module 104 routes user queries either to live agent engines 112, associated with live agents, or to virtual assistant engines 114, associated with the artificial intelligence module 103. A virtual assistant instantiated by an artificial intelligence module corresponds, for example, to a processing device executing a computer program and capable of electronic communications with a user device in order to emulate to some extent the behaviour of a human assistant.

As will be described in more detail below, this routing is for example based at least on the content of the user queries. Additionally, it may be based on other information, such as the location and/or client history associated with the user making the query. Routing is for example achieved by a simple switch, which directs packets of data containing the user query, and subsequent interactions from the user, to the live agent engines 112, or two the virtual assistant engines 114. Additionally or alternatively, routing may be performed by intercepting packets, and updating header data of the packets, and/or content of the packets, in order to address the packets to the selected destination.

The live agent engines 112 for example form part of the query response device 112, and comprise communication engines "L. A. ENGINE 1" to "L. A. ENGINE P". Each of these engines provides an interface to a corresponding live agent device 118, and for example supports interactions between one or more users and a live agent. For example, these engines 116 correspond to one or more software applications that at least partially provide the communication interface with each live agent. In alternative embodiments, these engines could be at least partially implemented on the corresponding agent device 118.

The number P of such engines for example defines the maximum number of live agents that may be in communication with users at any given instant, and for example equals the number of live agent devices 118. There could be any number of live agent engines, for example from 1 to several hundred or several thousand.

The virtual assistant engines 114 comprise a number of engines 120, labelled "V. A. ENGINE 1" to "V. A. ENGINE Q" in FIG. 1, and for example form part of the query response device 102. Alternatively, these engines could at least partially be implemented within the artificial intelligence module 103, which may be integral with or remote from the query response device 102. There could be any number Q of virtual assistant engines, for example from 1 to several hundred or several thousand.

Each of these virtual assistant engines 120 is configured to support interactions between one or more users and the artificial intelligence module 103, and in particular with virtual assistants instantiated by the artificial intelligence module 103. The artificial intelligence module 103 for example applies a set of rules and/or algorithms for dealing with user queries, and is capable of sustaining a typed or spoken conversation with users up to a point at which the user query has been resolved. For example, the artificial intelligence module 103 applies natural language processing to the user queries in order to extract the content of these queries, and in order to be able to interpret what response is required in order to resolve the user query.

In some embodiments, the routing rules 106 may define one or more keywords. If one of these keywords is present in a user query, the routing rules for example define that the query should be handled by a live agent via one of the live agent engines 112, or by a virtual assistant via one of the virtual assistant engines 114. As an example, if a keyword such as "virus", "no signal" or the like is present in the user query, this may designate a type of technical query that is complex to resolve and best handled by a live agent in order to avoid a lengthy and unproductive use of the artificial intelligence module 103. Alternatively, key words such as "change my offer" or "upgrade my phone" could be recognized as queries relating to sales that can be handled by a virtual assistant in an efficient manner.

It will be apparent to those skilled in the art that the particular routing rules 106 defined in the system can be chosen to provide a balance between efficient use of the artificial intelligence module 103, while minimizing the use of live agents. In particular, in many situations it will be beneficial to free up the time of live agents, such that they may invest their time in more profitable activities, such as roles of supervision, in order to improve the quality of the query resolutions.

Additionally, other information may be used by the routing module 104, as defined in the routing rules 106, to decide on how each user query should be routed. For example, context data, such as the country in which the user is located, the language spoken by the user, past interactions with a given user, etc., may determine when a query is better handled by a live agent or by a virtual assistant.

After a query has been routed to a live agent engine 112 or to a virtual assistant engine 114, the routing module 104 may continue to intercept the interactions between the user the agent/virtual assistant. This can serve one or two purposes.

Firstly, it may be determined later during the query resolution that a user being dealt with by an agent can be handed over to a virtual assistant, or that a virtual assistant has reached its limit for being able to resolve the query, and that the user should be handed over to a live agent. In either case, such a transfer can be achieved in an efficient manner using the routing module 104. For example, the routing module 104 stores a history of the interactions, such as messages, between each user and a live agent/virtual assistant, and to implement such a transfer, the routing module may provide this interaction history to the new engine that is to handle the user.

Secondly, in the case of a query being handled by a live agent, the routing module 104 for example identifies certain interactions that may be used for machine learning, in order to improve the performance of the artificial intelligence module 103.

Figure 2:
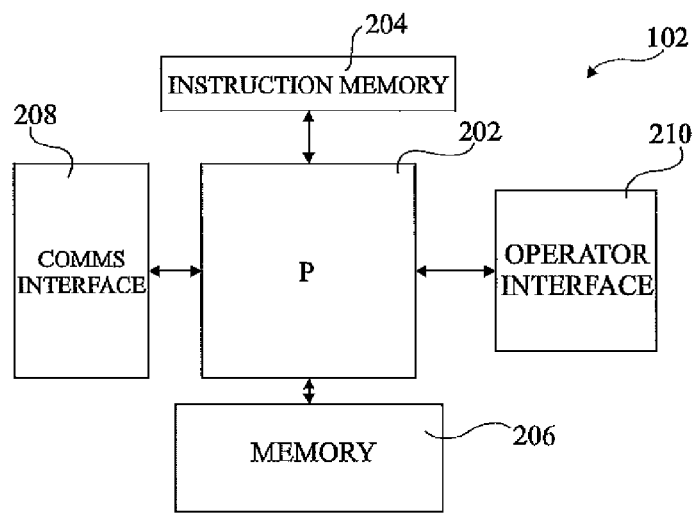
FIG. 2 schematically illustrates an example of a hardware implementation of the query response device of FIG. 1 according to an example embodiment of the present disclosure.

FIG. 2 schematically illustrates one example of hardware implementing the query response device 102 of FIG. 1 according to an example embodiment.

The device 102 for example comprises a processing device 202 comprising one or more processors under the control of program instructions stored in an instruction memory 204. Furthermore, the processing block 202 is for example in communication with a memory device 206, which for example stores the routing rules 106, based on which the routing module 104 routes user queries. A communications interface 208 for example provides an interface for receiving the user queries from the users, and for also communicating with the live agent devices 118 and the artificial intelligence module 103.

An operator interface 210 for example provides an interface, such as a display, for example a touch screen, and/or input keyboard, allowing the operator to control the operation of the routing module 104. For example, an operator may modify rules stored in the memory 206, and/or update the software stored in the instruction memory 204.

It will be apparent to those skilled in the art that FIG. 2 is merely one example, and that in alternative embodiments, many other implementations would be possible.

Figure 3:
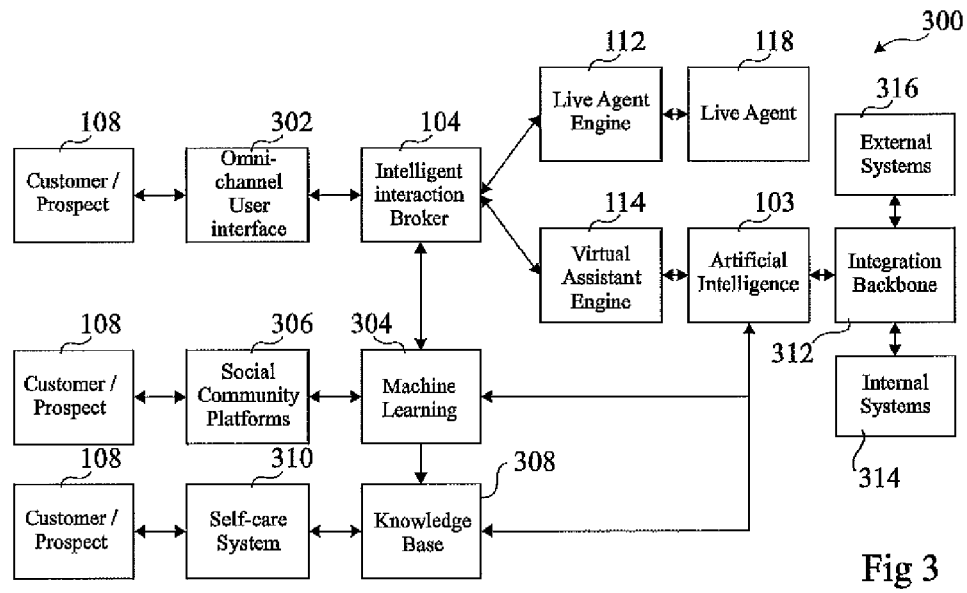
FIG. 3 schematically illustrates the system of FIG. 1 in more detail according to an example embodiment.

FIG. 3 schematically illustrates the query response system 100 of FIG. 1 in more detail according to an example embodiment. Certain elements depicted in FIG. 3 are the same as elements in the system of FIG. 1, and these elements have been labelled with like reference numerals and will not be described again in detail.

On the left in FIG. 3, a number of user devices 108 are shown, which in this example correspond to existing customer or prospective customer devices. One of these devices is shown submitting a user query via an omni-channel user interface 302, to routing module 104, which is labelled as an intelligent interaction broker in FIG. 3. The omni-channel user interface 302 may correspond to a software application loaded on the user device 108, to a webpage, or another type of interface allowing a user to communicate with the system via typed text messages and/or voice.

As illustrated in FIG. 3, the intelligent interaction broker 104 is configured to intercept certain interactions between users and live agents and provide them to a machine learning module 304. The machine learning module 304 for example automatically detects certain rules from the interactions between the users and live agents, and uses these rules to enrich the artificial intelligence module 103, for example by creating new rules for it to follow. The machine learning module 304 may also update operation of the artificial intelligence module 103 based on other data, such as social community platforms 306, which may alert the system to issues that have been discussed on technical forums. As will be apparent to those skilled in the art, the machine learning module 304 may be entirely automated, such that the artificial intelligence module 103 learns without manual intervention. Alternatively, the machine learning module 304 may be operated, at least partially, manually by an operator or programmer. For example, the operator/programmner may identify the best query responses that can be used to define general rules.

Furthermore, in some embodiments, the artificial intelligence module applies different levels of significance to keywords detected in the user messages. For example, the presence in a user message of a relatively low number of keywords associated a high level of significance triggers the intervention of a live agent, whereas if these keywords are not present, the presence of a relatively high number of keywords associated with a low level of significance may be required before the intervention of a live agent is triggered. The machine learning module for example adapts the significance level of keywords by performing machine learning based on responses provided by live agents. For example, a keyword having a high significance may relate to a technical issue that the artificial intelligence module is initially unable to resolve, but once new rules have been created by the machine learning module, the significance of this keyword may be reduced. On the contrary, a keyword may have a low significance until a new type of technical issue arises linked to this keyword that the artificial intelligence module is initially unable to resolve. Therefore the machine learning module for example increases the significance of this keyword until it has learnt the appropriate rules for resolving such an issue.

A knowledge base 308, for example in the form of a database or the like stored in a memory, is also accessible by the artificial intelligence module 103. The knowledge base for example includes a question and answer database, which may include a list of common questions, and their solutions. The artificial intelligence module 103 for example makes reference to this knowledge base when devising responses to user queries. The data used by the machine learning module 304 to modify the operation of the artificial intelligence module 103 may also be used to modify the knowledge base 308. The knowledge base 308 is also for example modified by a self-care system 310, which could be a user website interface or forum in which experts may respond to user questions.

The artificial intelligence module 103 also for example has access, via an integration backbone 312, to internal systems 314 and/or external systems 316 providing further data, which may be used to generate a response to a user query. For example, the internal systems 314 may include a client database, a social profile associated with a given user, CRM (Customer Relationship Manager) data, or other data indicating previous interactions with the given user etc. The external systems 316 may include one or more social networks, providing further context information on users, such as age, preferences, spoken languages, etc.

In FIG. 3, the various components of the query response system may communicate with each other directly over internal or external channels, even where arrows are not shown directly connecting the components.

Figure 4:
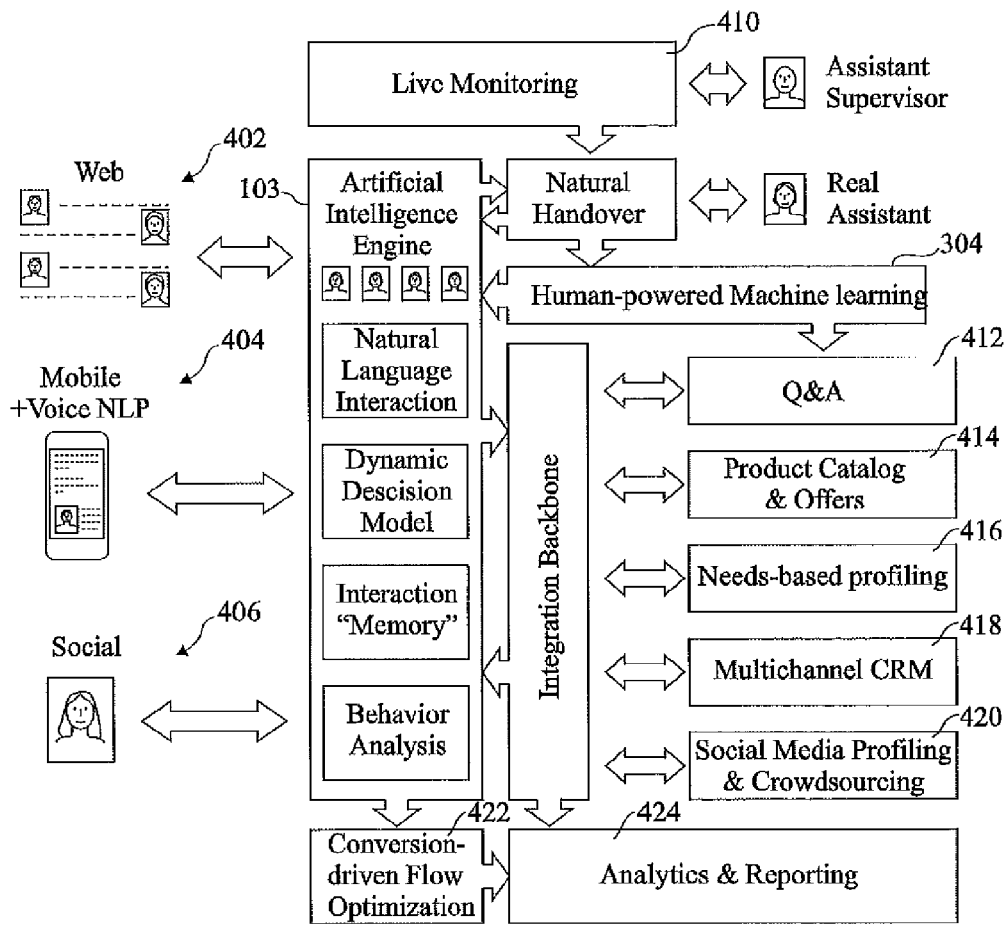
FIG. 4 is a block diagram representing functions of the system of FIG. 1 according to an example embodiment.

FIG. 4 is a diagram representing functions of elements in the system of FIGS. 1 and 3 according to an example embodiment.

As illustrated on the left in FIG. 4, a user device used to submit a query may correspond to a web chat interface 402, mobile and voice NLP (Natural language processing) application, or a social media platform 406.

The artificial intelligence module 103 for example comprises an artificial intelligence engine having the functions of: natural language interaction, allowing spoken or written natural language received from a user to be interpreted, and natural language responses to be generated; a dynamic decision module corresponding to the function of making decisions, based on rules, on how to respond to user queries; an interaction memory, storing a history of interactions between a user and a live agent/virtual assistant, for example including messages sent to and from the user; and a behavior analysis function, which may include an algorithm for detecting certain aspects of the interaction with the user, such as emotion, which could indicate when a customer is not satisfied.

The routing module 104 is for example capable of applying a natural handover from a virtual assistant to a live agent, or vice versa, which may be triggered by a live monitoring function 410. As shown in FIG. 4, this monitoring could be performed by an assistant supervisor. Alternatively, it could be performed by the routing module 104 described above.

The integration backbone 312 for example has access to data including: a question and answer database 412; product catalogs and offers 414; needs-based profiling data 416, for example indicating recommendations associated with certain customer needs; multi-channel customer relationship manager data 418, which may for example include information on recent interactions with the user; and social media profiling and crowdsourcing data 420, for example indicating users interactions on social media sites.

A conversion-driven flow optimization function 422, and analytics and reporting function 424, for example allow an analysis of the interactions leading to the best outcome for users in general, such that rules can be determined for improving performance of the system in terms for example of average time taken to resolve a query.

FIG. 5 is a flow diagram illustrating operations in a method for processing a user query according to example embodiment.

In a first operation 502, a user query is received. For example, one or more user messages are received detailing the user query.

In a subsequent operation 504, based at least on the query content, and optionally on other data, the query is routed to a live agent or a virtual assistant. For example, the routing is based on the contents of the one or more user messages. In some embodiments, user messages relating to a new user query are initially routed to one of the virtual assistant engines. After a certain number of messages, the routing module is then adapted to decide whether the virtual assistant engine should continue to handle the user query, or whether messages should be routed to one or the live agent engines. In such a case, a live agent is for example invited to join the conversation, in other words to start receiving user messages. Messages for example continue to be monitored by the routing module and certain messages are for example intercepted and provided to the machine learning module in order to extend the range of user queries that the virtual assistants instantiated by the artificial intelligence module are able to resolve. FIG. 6 is a flow diagram illustrating operations in a method for performing a user handover, for example by inviting a live agent to join a conversation, in the case of a user interaction being handled by a virtual assistant.

In the first operation 602, interactions, for example messages in a form of text and/or voice, sent to and from between a user and the virtual assistant are intercepted by the routing module 104, and monitored.

In a subsequent operation 604, it is determine whether a handover event has been detected. For example, a handover event may correspond to a certain keyword or query present in a user message that suggests that a virtual assistant will no longer be able to resolve the user issue. Alternatively, the handover event may correspond to a certain type of language used by the user, for example indicating dissatisfaction.

If no such event is detected, operation is 602 is repeated. However, when a handover event is detected, the next operation is 606, in which user messages, including for example one or more past messages, are routed to a live agent. In some embodiments, this involves inviting a live agent to join the conversation, and the routing module continues to monitor interactions between the user and the live agent in order to implement machine learning and/or identify a point at which it may be able to resume control of the user query resolution.

In some embodiments, user messages relating to a first user query may be routed to a virtual assistant, and then to a live agent if it is determined that the virtual assistant is unable to resolve at least part of the user query. At least one message communicated by the live agent to the user is then for example intercepted by the routing module and supplied to the matching learning module in order to create at least one new rule for dealing with the first user query. A second user query from a second user relating to the same issue as the first user query is then for example handled by a virtual assistant based on the at least one new rule that was created.

In some embodiments, the use of live agents in the system is automatically regulated by the routing module based on a user satisfaction threshold. For example, the user satisfaction threshold is a parameter stored in a memory of the routing module and which can for example be set by a system administrator. The faster a user query can be resolved, the higher the user satisfaction is likely to be, and in general live agents are able to resolve new types of user queries more quickly than virtual assistants. Therefore, the number N of messages between a user and a virtual assistant before a live agent is invited to take over the query resolution is for example dependent on the user satisfaction threshold defined by the system.

FIG. 7 is a graph representing, by a curve 702, an example of customer satisfaction as a function of the level of automation in the system, presented by a line 704. Indeed, in some embodiments, the system may be configured or adjusted to control between a "customer experience" and/or "priority on cost or resource allocation", as represented by arrows 706 and 708 respectively. In other words, a system administrator can adjust the system in one case where customer experience is an important factor such that a live agent would be connected to the user for most if not all inquiries. In another case, the administrator can adjust the system where cost or resource allocation is deemed to be an important factor. In such a case, most if not all inquiries will be handled by the virtual assistant with only minimum intervention by a live agent if at all. The latter setting would likely be more cost effective than having a live agent involved more often. The system administrator can certainly adjust this setting as desired for the appropriate level of "customer experience" versus a "priority on cost or resource allocation". An example of such a setting is labelled 712 in FIG. 7, and for example corresponds to a threshold level of customer satisfaction represented by a dashed line 710 in FIG. 7. This will result in a corresponding level 714 of automation in the system.

The threshold of when a live agent and/or virtual assistant may need to get involved (e.g., based on the setting as described in the paragraph above) may be based on a variety of factors as described in this application including key words detected in the conversation, the number N of messages between the user a user and virtual assistant, a duration of call between the user and system, any emotions of a user detected by the system (e.g., frustration, anger, anxiety, etc.), and/or any other factors that can help determine when it may be appropriate for an live agent and/or a virtual assistant to be involved in the discussion or inquiry.

For example, the lower the user satisfaction threshold, the higher the level of automation in the system, and thus the greater the number N of messages before a live agent is invited to join a conversation. The higher the user satisfaction threshold, the lower the level of automation in the system, and the lower the number N of messages before a live agent is invited to join a conversation.

FIG. 8 is a flow diagram illustrating operations in a method for performing a user handover in the case of a user interaction being handled by a live agent.

In a first operation 802, a handover request is received from the live agent. In particular, the live agent may see that the remaining queries to be resolved with the user can be handled by a virtual assistant. Alternatively, the routing module 104 may intercept messages, and detect that remaining user queries can be resolved by a virtual assistant, and propose to the live agent to perform a handover.

In a subsequent operation 804, user messages, including one or more past messages, are routed to a virtual assistant.

The following interaction sequence provides one example of processing of a query according to an embodiment of the present disclosure:

User John: Hi, my wifi drops from time to time when I'm in my bedroom. How can I fix this?
Virtual Assistant: Hi John, here is a video that explains how to position your router. Does it help?
User John: No, I already watched it. No success. This is getting really annoying!!
Virtual Assistant: I'm sorry to hear this. Please bear with me for a moment, I will invite an expert.
A natural handover is automatically triggered, opening a live session with an available human assistant.

Live agent: Hi John, could you tell me how many walls stand between your router and your bedroom, and the approximate distance?
User John: 5 walls, about 20 meters
Live agent: Ok, so you might solve your problem by installing a WIFI Repeater to extend your wireless coverage
The human assistant flags the interaction to be taught to the Artificial Intelligence. Every future interaction will be automated.
User John: How much does it cost?
The live agent triggers a handover back to a virtual assistant to deal with the Wifi Repeater query. The virtual assistant identifies an upsell opportunity based on CRM data (John is a loyal customer) and Social Profile data (John likes travel related pages on Facebook)
Virtual Assistant: The WIFI Repeater Kit costs 129€, but if you like travelling I may have an offer for you. Would you like to hear it?
User John: Why not
Virtual Assistant: Until Friday, we offer 50% off WIFI Repeater Kits if you subscribe a 3G Everywhere plan for 10€/month. You can cancel at any time. With 3G Everywhere, you get instant Internet access on the go.
User John: Great, let's go for it.
A complete order page is brought up
Virtual Assistant: Fantastic. Here is the order page. Please click on the BUY NOW button.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more nodules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method, comprising:
monitoring, by a device, one or more first messages exchanged between a virtual assistant and a user;
detecting, by the device and based on using artificial intelligence to monitor the one or more first messages, a handover event,
the handover event including at least one of:
the one or more first messages including a particular keyword or a particular query, or
the one or more first messages including a particular type of message;
routing, by the device and based on detecting the handover event, the one or more first messages to a live agent;
monitoring, by the device and based on routing the one or more first messages to the live agent, one or more second messages exchanged between the live agent and the user; and
providing, by the device, at least one second message of the one or more second messages to a machine learning module,
wherein the machine learning module generates one or more rules based on interactions between the live agent and the user and the one or more first messages,
wherein generating the one or more rules comprises:
adapting a level of significance associated with the particular keyword or the particular query based on the artificial intelligence and the interactions between the live agent and the user.

2. The method of claim 1, wherein the particular type of message is a message indicating dissatisfaction.

3. The method of claim 1, wherein routing the one or more first messages to the live agent comprises:
providing an invitation to the live agent.

4. The method of claim 1, further comprising:
creating a rule associated with a particular type of query based on providing the at least one second message to the machine learning module.

5. The method of claim 1, wherein the user is a first user; and
wherein the method further comprises:
determining that a query from a second user is associated with a same issue as the particular query; and routing, based on determining that the query from the second user is associated with the same issue as the particular query, one or more third messages from the second user to the virtual assistant.

6. The method of claim 1, further comprising:
detecting a particular emotion based on monitoring the one or more first messages; and
wherein detecting the handover event comprises:
detecting the handover event based on detecting the particular emotion.

7. The method of claim 1, wherein the handover event is a first handover event; and
wherein the method further comprises:
detecting a second handover event based on monitoring the one or more second messages; and
providing, to the live agent and based on detecting the second handover event, a request to perform a handover.

8. A device, comprising:
one or more memories; and
one or more processors configured to:
monitor one or more first messages exchanged between a virtual assistant and a user;
detect, based on using artificial intelligence to monitor the one or more first messages, a trigger for a handover to a live agent,
the trigger including at least one of:
the one or more first messages including a particular keyword or a particular query, or
the one or more first messages including a particular type of message;
perform, based on detecting the trigger, the handover to the live agent;
monitor, based on performing the handover to the live agent, one or more second messages exchanged between the live agent and the user; and
provide at least one second message of the one or more second messages to a machine learning module,
wherein the machine learning module generates one or more rules based on interactions between the live agent and the user and the one or more first messages,
wherein generating the one or more rules comprises:
adapting a level of significance associated with the particular keyword or the particular query based on the artificial intelligence and the interactions between the live agent and the user.

9. The device of claim 8, wherein the particular type of message is a message indicating dissatisfaction.

10. The device of claim 8, wherein the one or more processors, when performing the handover to the live agent, are configured to:
provide an invitation to the live agent for the handover.

11. The device of claim 8, wherein the one or more processors are further configured to:
create a rule associated with a particular type of query based on providing the at least one second message to the machine learning module.

12. The device of claim 8, wherein the user is a first user; and
wherein the one or more processors are further configured to:
determine that a query from a second user is associated with a same issue as the particular query; and
route, based on determining that the query from the second user is associated with the same issue as the particular query, one or more third messages from the second user to the virtual assistant.

13. The device of claim 8, wherein the one or more processors are further configured to:
detect a particular emotion based on monitoring the one or more first messages; and
wherein the one or more processors, when detecting the trigger, are configured to:
detect the trigger based on detecting the particular emotion.

14. The device of claim 8, wherein the trigger is a first trigger;
wherein the one or more processors are further configured to:
detect a second trigger based on monitoring the one or more second messages; and
provide, to the live agent and based on detecting the second trigger, a request to perform a handover to the virtual assistant.

15. A non-transitory computer-readable medium storing instructions, the instructions comprising:
one or more instructions that, when executed by one or more processors, cause the one or more processors to:
monitor one or more first messages exchanged between a virtual assistant and a user;
determine, based on using artificial intelligence to monitor the one or more first messages, whether a handover event has occurred,
the handover event including at least one of:
the one or more first messages including a particular keyword or a particular query, or
the one or more first messages including a particular type of message;
perform, based on determining that the handover event has occurred, a handover to a live agent;
monitor, based on performing the handover to the live agent, one or more second messages exchanged between the live agent and the user; and
provide at least one second message of the one or more second messages to a machine learning module,
wherein the machine learning module generates one or more rules based on interactions between the live agent and the user and the one or more first messages,
wherein generating the one or more rules comprises:
adapting a level of significance associated with the particular keyword or the particular query based on the artificial intelligence and the interactions between the live agent and the user.

16. The non-transitory computer-readable medium of claim 15, wherein the particular type of message is a message indicating dissatisfaction.

17. The non-transitory computer-readable medium of claim 15, wherein the one or more instructions, that cause the one or more processors to perform the handover to the live agent, cause the one or more processors to:
provide an invitation to the live agent for the handover.

18. The non-transitory computer-readable medium of claim 15, wherein the one or more instructions, when executed by the one or more processors, further cause the one or more processors to:
create a rule associated with a particular type of query based on providing the at least one second message to the machine learning module.

19. The non-transitory computer-readable medium of claim 15, wherein the user is a first user; and wherein the one or more instructions, when executed by the one or more processors, further cause the one or more processors to:
 determine that a query from a second user is associated with a same issue as the particular query; and
 route, based on determining that the query from the second user is associated with the same issue as the particular query, one or more third messages from the second user to the virtual assistant.

20. The non-transitory computer-readable medium of claim 15, wherein the one or more instructions, when executed by the one or more processors, further cause the one or more processors to:
 detect a particular emotion based on monitoring the one or more first messages; and
 wherein the one or more instructions, that cause the one or more processors to determine whether the handover event has occurred, cause the one or more processors to:
 determine that the handover event has occurred based on detecting the particular emotion.

* * * * *